United States Patent [19]

Gau

[11] 4,056,977
[45] Nov. 8, 1977

[54] SWIRLER FOR A FLUID FLOWMETER AND METHOD OF MAKING SAME

[75] Inventor: Leonard P. Gau, Birmingham, Mich.

[73] Assignee: Chrysler Corporation, Highland Park, Mich.

[21] Appl. No.: 681,628

[22] Filed: Apr. 29, 1976

[51] Int. Cl.² ............................................. G01F 1/32
[52] U.S. Cl. .......................... 73/272 R; 29/156.8 R; 29/455 R; 138/37; 73/194 C
[58] Field of Search ................... 29/156.8 B, 156.8 R, 29/469, 455; 138/37, 42; 239/487, 488; 73/194 B, 194 C, 272

[56] References Cited
U.S. PATENT DOCUMENTS

| | | | |
|---|---|---|---|
| 1,446,086 | 2/1923 | Green | 138/37 |
| 2,649,243 | 8/1953 | Stalker | 29/156.8 |
| 2,823,889 | 2/1958 | Stalker | 29/156.8 |
| 3,616,693 | 11/1971 | Burgess | 73/194 |

Primary Examiner—Herbert Goldstein
Attorney, Agent, or Firm—Baldwin & Newtson

[57] ABSTRACT

A swirler for a fluid flowmeter comprises a plurality of axially and circumferentially overlapping swirl blades within a flow conduit which impart a swirling motion to fluid passing therethrough. The swirler is constructed of a first element containing selected ones of said blades which are circumferentially non-overlapping and a second element containing the remaining blades which are also circumferentially non-overlapping; the two elements are assembled so as to bring the blades of each element into overlapping relationship with those of the other element.

17 Claims, 6 Drawing Figures

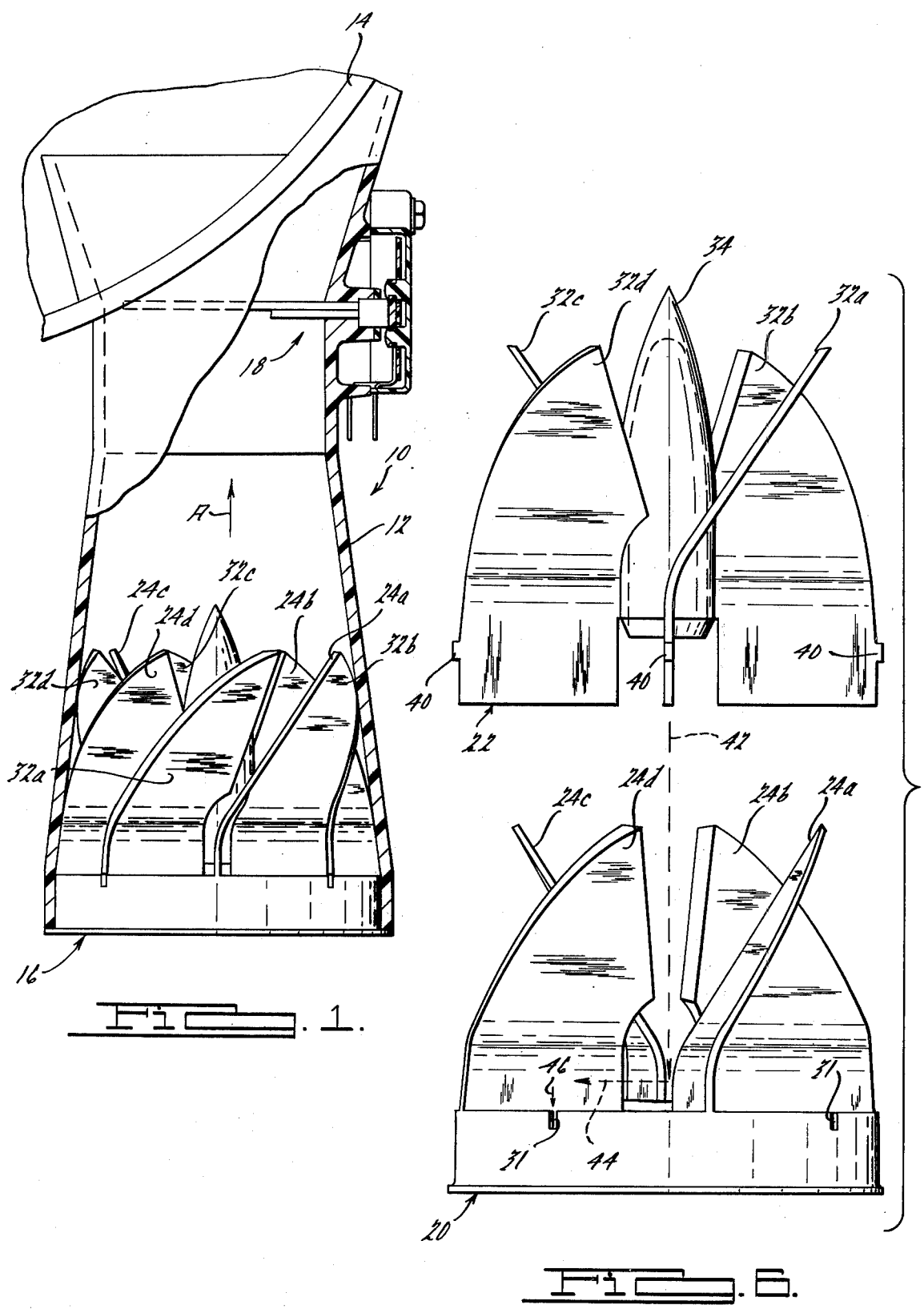

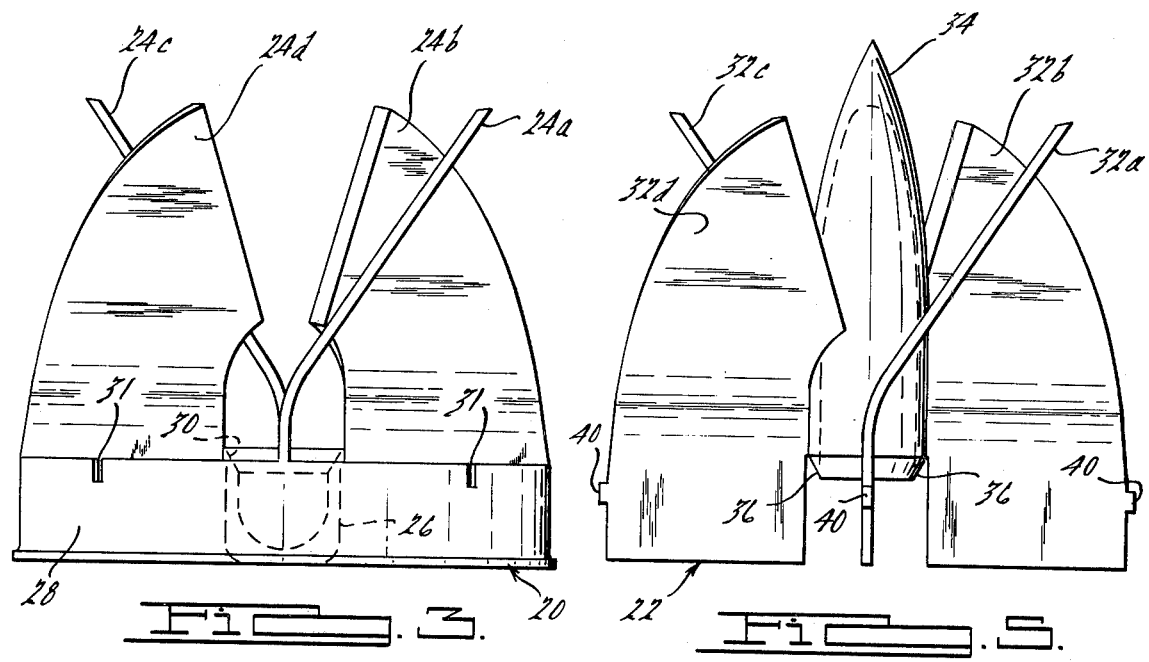
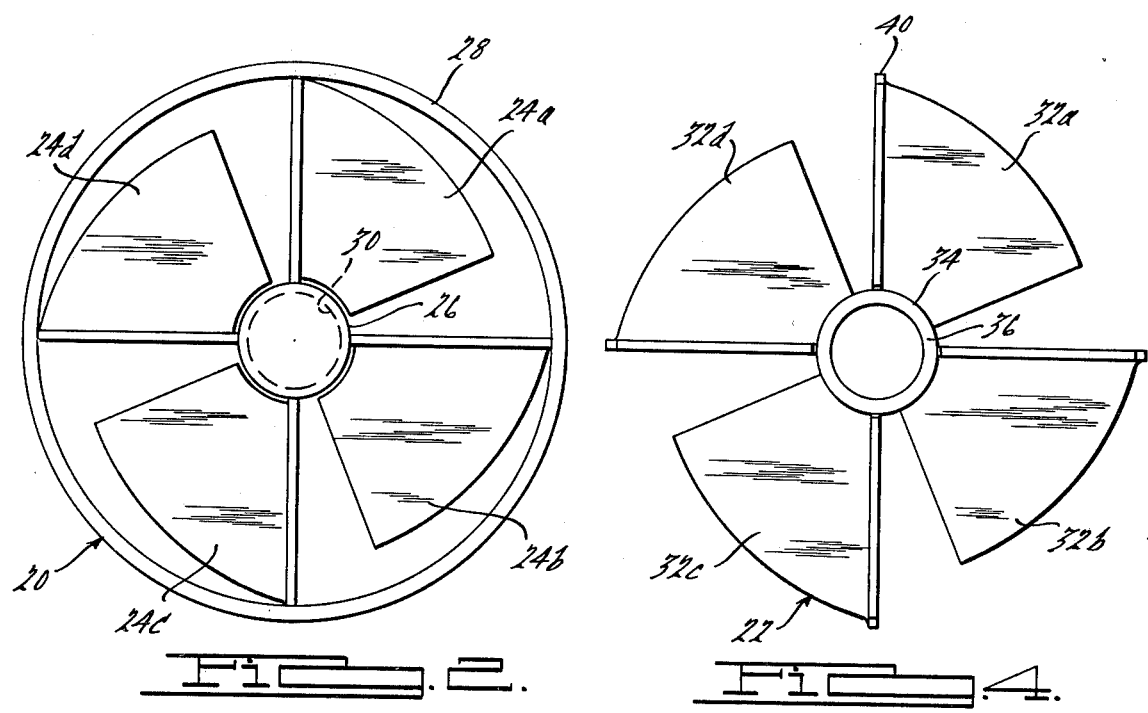

SWIRLER FOR A FLUID FLOWMETER AND METHOD OF MAKING SAME

BACKGROUND AND SUMMARY OF THE INVENTION

This invention relates broadly to fluid flowmeters and is particularly concerned with a novel swirler for a flowmeter and a method of making the same.

U.S. Pat. No. 3,616,693 discloses a swirl-type flowmeter containing a swirler of the general type to which the present invention relates. In order to impart the desired swirl to the fluid passing through the flowmeter, immediately adjacent blades of the swirler must be both axially and circumferentially overlapping. While the disclosure of this prior patent fails to address itself to the manner of fabricating the swirler, the drawings thereof suggest that the blades are individually fabricated and then joined to an outer ring which is in turn inserted onto a central hub with each of the blades lodging in a corresponding axial groove in the hub.

The present invention is directed to an improvement in the foregoing type of swirler and relates both to the article per se and to the method of its manufacture. An outstanding attribute of the present invention is that the cost of making such a swirler is dramatically reduced. This is because the swirler can be made from two molded plastic parts which are subsequently assembled together. Furthermore, each of the two molded plastic parts can be made by means of simple molding dies. Thus, the invention makes the mass production fabrication of a fluid flowmeter embodying a swirler of this type economically feasible.

The accompanying drawings disclose a preferred embodiment of the present invention according to the best mode presently contemplated in carrying out the invention.

BRIEF DESCRIPTION OF THE DRAWINGS

FIG. 1 is a top plan view, partly in section, of a fluid flowmeter having a swirler embodying principles of the present invention.

FIG. 2 is an axial end view of one of the two elements of the swirler shown in FIG. 1.

FIG. 3 is a longitudinal view of the element shown in FIG. 2.

FIG. 4 is an axial end view of the second element of the swirler shown in FIG. 1.

FIG. 5 is a longitudinal view of the element shown in FIG. 4.

FIG. 6 is an exploded view of the two elements illustrating how they are assembled together.

DESCRIPTION OF THE PREFERRED EMBODIMENT

FIG. 1 shows an illustrative, but preferred, embodiment of a fluid flowmeter 10 embodying the present invention which is adapted for use to measure induction airflow into an internal combustion engine as used in a motor vehicle. Flowmeter 10 is provided in the air intake snorkel, or air horn, 12 which projects from the air filter housing 14 and through which air is inducted by the engine, the general direction of airflow being indicated by the arrow A. The swirler 16 embodying principles of the invention is disposed in snorkel 12 at the inlet thereof to impart a swirling motion to the induction air. A sensing probe assembly 18 is located downstream of swirler 16 to detect a characteristic of the swirling air and provide via appropriate circuitry an electrical signal representative of the volumetric flow rate of air through the snorkel. An especially well-suited probe is disclosed in U.S. Pat. No. 3,830,104, assigned to the same assignee as the present application. The improvement provided by the present invention relates specifically to swirler 16. In accordance with principles of the invention, swirler 16 is constructed from two separate elements which are identified by the reference numerals 20 and 22 respectively. Element 20 is shown in detail in FIGS. 2 and 3 while element 22 is shown in detail in FIGS. 4 and 5. Both elements are molded plastic parts which may be fabricated using conventional molding techniques. By way of example glass-filled nylon or polyester are suitable plastics. Element 20 comprises four individual, identical swirling blades 24a, 24b, 24c, 24d, which are uniformly circumferentially arranged about a central hub 26. The radially outer edges of the individual blades are joined at their upstream ends by an integral circular ring 28. As can be seen in FIG. 3 the individual blades project axially downstream of both hub 26 and ring 28. However, as can be seen in FIG. 2, the blades are circumferentially non-overlapping. A circular, conically-rimmed, locating hole 30 is provided in the downstream end of hub 26. Four uniformly, circumferentially arranged locating slots 31 are provided in ring 28 for use in locating the two elements, as will be seen later.

Element 22, shown in FIGS. 4 and 5, comprises a plurality of four blades 32a, 32b, 32c and 32d which are uniformly circumferentially arranged around a tapered, hollow central hub 34. Blades 32a, 32b, 32c and 32d are identical to those of element 20 and project slightly axially upstream beyond the upstream end of hub 34 which is provided with a central conical nose 36 adapted to seat on the conically rimmed hole 30 of element 20. As can be seen in FIG. 4 the four blades of element 22 are circumferentially non-overlapping. Four radially directed locating tabs 40 are provided on the blades of element 22 for cooperation with slots 31 in locating the two elements.

FIG. 6 illustrates how the elements 20 and 22 are assembled together. The two elements are positioned in substantial axial alignment with each other, with element 22 being disposed in downstream relation to element 20. The two elements are dimensioned with that sufficient circumferential clearance is provided between immediately adjacent blades of element 20 to permit the upstream ends of the blades of element 22 to fit between immediately adjacent blades of element 20 as the two elements are relatively advanced toward each other, for example, as indicated by the arrow 42. As the blades of the two elements are more fully interdigitated, a point is reached where the two elements may then be also relatively rotated as indicated by the arrow 44 to register tabs 40 with slots 31. Final assembly is achieved by lodging tabs 40 into slots 31 (arrow 46) thereby axially and circumferentially locating the two elements with respect to each other. Permanent joining may be accomplished by any suitable means, for example, by means of adhesive, mechanical fasteners, ultrasonic welding etc. As will be apparent from considertion of the drawings, the assembled swirler has the forward, or upstream ends of blades 32a, 32b, 32c and 32d disposed between hub 26 and ring 28 so that they axially overlap both hub 26 and ring 28 and extend radially therebetween. Also, the portions of blades 24a, 24b, 24c, and 24d which extend axially beyond the hub 26 of their own piece axially overlap and are disposed radially outwardly of hub 34.

One principal advantage of the present invention is that the two plastic elements can be molded with maximum dimensional accuracy and maximum production speed. As best seen in FIGS. 2 and 4, neither element 20 nor 22 will create a die interlock condition during molding and hence each can be fabricated using simple, straight parting dies. The two elements can also be assembled together with facility and accuracy. Thus, there has been disclosed a novel swirler and method of making it representing a significant contribution in minimizing the cost of such a device.

What is claimed is:

1. In a fluid swirler or like device comprising a plurality of blades which are both axially and circumferentially overlapping, the combination of:
   a first element containing selected ones of said blades which are circumferentially non-overlapping; and
   a second element containing other selected ones of said blades which are circumferentially non-overlapping;
   said two elements being assembled such that at least one blade of one of said elements circumferentially and axially overlaps a blade of the other of said elements;
   said first element including a central hub joining radially inner peripheral edge portions of the blades thereof and an integral ring joining outer peripheral edge portions of the blades thereof, said second element comprising an integral central hub joining radially inner peripheral edge portions of the blades thereof, said two hubs engaging each other, and including locating slots in said ring and locating tabs on the blades of said second element disposed in said locating slots.

2. In a fluid swirler or like device comprising a plurality of swirl blades wherein each blade axially and circumferentially overlaps immediately adjacent blades, the combination of:
   a first molded plastic element containing selected ones of said blades which are circumferentially non-overlapping;
   a second molded plastic element containing other selected ones of said blades which are circumferentially non-overlapping; and
   a locating tab protruding from a blade of one of said two elements into a matching locating slot in the other of said two elements for axially and circumferentially locating said two elements with respect to each other.

3. The combination set forth in claim 2 wherein said locating tab protrudes radially from an edge of said blade of said one element.

4. A fluid swirler or like device having a plurality of swirl blades wherein each blade axially and circumferentially overlaps immediately adjacent blades, and being of two piece construction, comprising:
   a first molded plastic piece containing selected ones of said blades which are circumferentially non-overlapping, a central hub joining radially inner peripheral edge portions of said selected ones of said blades, and an outer ring joining radially outer peripheral edge portions of said selected ones of said blades; and
   a second molded plastic piece containing other selected ones of said blades which are circumferentially non-overlapping, and a central hub joining radially inner peripheral edge portions of said other selected ones of said blades, said other selected ones of said blades having portions thereof extending axially forwardly beyond the central hub of their own piece and and being disposed between the ring and the hub of said first piece.

5. A fluid swirler or like device as set forth in claim 4 wherein each blade of each piece comprises a planar first blade section disposed in a radial plane and a second blade section extending from the first blade section.

6. A fluid swirler or like device as set forth in claim 4 wherein the blades of said two pieces are uniformly circumferentially arranged about the axis of the swirler.

7. A fluid swirler or like device as set forth in claim 4 wherein all blades are of substantially identical shape.

8. A fluid swirler or like device as set forth in claim 4 wherein the central hubs of said first and second pieces are disposed in axial abutment with each other.

9. A fluid swirler or like device as set forth in claim 4 wherein a locating tab projects radially outwardly from an edge of a blade of said second piece and is disposed within a locating slot provided in the ring of said first piece for axially and circumferentially locating the two pieces with respect to each other.

10. A fluid swirler or like device having a plurality of swirl blades wherein each blade axially and circumferentially overlaps immediately adjacent blades, and being of two piece construction, comprising:
    a first molded plastic piece containing selected ones of said blades which are circumferentially non-overlapping, and a central hub joining radially inner peripheral edge portions of said selected ones of said blades, said selected ones of said blades having portions thereof extending axially rearwardly beyond the hub of their own piece; and
    a second molded plastic piece containing other selected ones of said blades which are circumferentially non-overlapping, and a central hub joining radially inner peripheral edge portions of said other selected ones of said blades, said other selected ones of said blades having portions thereof extending axially forwardly beyond the hub of their own piece to be disposed axially overlapping and radially outwardly of the hub of said first piece, said portions of said selected ones of said blades being disposed axially overlapping and radially outwardly of the hub of said second piece.

11. A fluid swirler or like device as set forth in claim 10 wherein the central hubs of the two pieces are disposed in axial abutment with each other.

12. A fluid swirler or like device as set forth in claim 10 wherein the central hubs of the two pieces are disposed in axial alignment with each other.

13. A fluid swirler or like device as set forth in claim 10 wherein said first piece includes a ring joining radially outer peripheral edge portions of the blades of said first piece and the axially forwardly extending portions of the blades of said second piece are disposed radially between the ring and the hub of said first piece.

14. The method of making, from only two pieces, a fluid swirler or like device having a plurality of swirl blades wherein each blade axially and circumferentially overlaps immediately adjacent blades comprising:
    molding a first plastic piece containing selected ones of said blades which are circumferentially non-overlapping, a central hub joining radially inner peripheral edge portions of said selected ones of said blades, and an outer ring joining radially outer peripheral edge portions of said selected ones of said blades;

molding a second plastic piece containing other selected ones of said blades which are circumferentially non-overlapping and a central hub joining radially inner peripheral edge portions of said other selected ones of said blades with said other selected ones of said blades having portions thereof extending axially forwardly beyond the hub of their own piece;

and then assembling the two pieces by positioning one axially of the other, and then axially and circumferentially moving them toward each other to interdigitate the blades thereof and dispose the axially forwardly extending portions of said other selected ones of said blades between the hub and the ring of said first piece.

15. The method as set forth in claim 14 including the step of locating the two pieces both axially and circumferentially with respect to each other by disposing a locating tab on a blade of said second piece within a matching locating slot in the ring of said first piece.

16. The new method as set forth in claim 14 including the step of permanently joining the two pieces in assembled position after the last-mentioned step has been completed.

17. The method of making, from only two pieces, a fluid swirler or like device having a plurality of swirl blades wherein each blade axially and circumferentially overlaps immediately adjacent blades comprising:

molding a first plastic piece containing selected ones of said blades which are circumferentially non-overlapping, and a central hub joining radially inner peripheral edge portions of said selected ones of said blades with said selected ones of said blades having portions thereof extending axially rearwardly beyond said central hub;

molding a second plastic piece containing other selected ones of said blades which are circumferentially non-overlapping, and a central hub joining radially inner peripheral edge portions of said other selected ones of said blades with said other selected ones of said blades having portions thereof extending axially forwardly beyond the central hub of their own piece; and then assembling the two pieces by positioning one axially of the other, and then axially and circumferentially moving them toward each other to interdigitate the blades thereof and dispose the axially forwardly extending portions of said other selected ones of said blades axially overlapping and radially outwardly of the hub of said first piece and also dispose the axially rearwardly extending portions of said selected ones of said blades axially overlapping and radially outwardly of the hub of said second piece.

* * * * *